(12) United States Patent
Matsuura

(10) Patent No.: US 8,876,353 B2
(45) Date of Patent: Nov. 4, 2014

(54) LIGHTING APPARATUS

(75) Inventor: Yasuhiro Matsuura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 299 days.

(21) Appl. No.: 13/489,060

(22) Filed: Jun. 5, 2012

(65) Prior Publication Data

US 2012/0314451 A1    Dec. 13, 2012

(30) Foreign Application Priority Data

Jun. 13, 2011  (JP) ................................. 2011-131267

(51) Int. Cl.
F21V 7/04       (2006.01)
F21V 8/00       (2006.01)

(52) U.S. Cl.
CPC ............ G02B 6/0078 (2013.01); G02B 6/0068 (2013.01); Y10S 362/80 (2013.01)
USPC ........... 362/613; 362/602; 362/231; 362/235; 362/800

(58) Field of Classification Search
CPC .. G02B 6/0068; G02B 6/0001; G02B 6/0073; G02B 6/0075; G02B 6/0078; G02F 1/133615; G02F 1/133603; G03B 21/2013; G03B 21/2033
USPC ........ 362/612, 227, 602, 231, 97.1, 235, 230, 362/800, 236, 613
See application file for complete search history.

(56) References Cited

U.S. PATENT DOCUMENTS

| | | | |
|---|---|---|---|
| 2005/0162850 A1* | 7/2005 | Luk et al. | 362/227 |
| 2008/0158886 A1* | 7/2008 | Pang et al. | 362/294 |
| 2012/0087150 A1* | 4/2012 | Hamada et al. | 362/612 |
| 2012/0099303 A1* | 4/2012 | Li et al. | 362/231 |
| 2012/0147333 A1* | 6/2012 | Jorgensen | 353/31 |
| 2012/0154759 A1* | 6/2012 | Jorgensen | 353/31 |
| 2012/0262940 A1* | 10/2012 | Miyairi et al. | 362/602 |
| 2013/0016133 A1* | 1/2013 | Chen et al. | 345/690 |

FOREIGN PATENT DOCUMENTS

| | | |
|---|---|---|
| JP | 2001-351425 | 12/2001 |
| JP | 2005-243347 | 9/2005 |

* cited by examiner

Primary Examiner — Britt D Hanley
Assistant Examiner — Kevin Quarterman
(74) Attorney, Agent, or Firm — Cowan, Liebowitz & Latman, P.C.

(57) ABSTRACT

A lighting apparatus according to the present invention includes a light guiding unit and a plurality of light sources arranged along the incidence face of the light guiding unit. The plurality of light sources are constituted by a plurality of light source groups such that one light source group corresponds to one block. The one light source group includes a plurality of white light sources and a plurality of color light sources. Among the plurality of color light sources included in the one light source group, the color light sources with an emission color of the highest light intensity, when the light sources are driven under identical drive conditions, are disposed at both ends of the light source group. All of the white light sources included in the plurality of light sources arranged along the incidence face are disposed equidistantly.

9 Claims, 8 Drawing Sheets

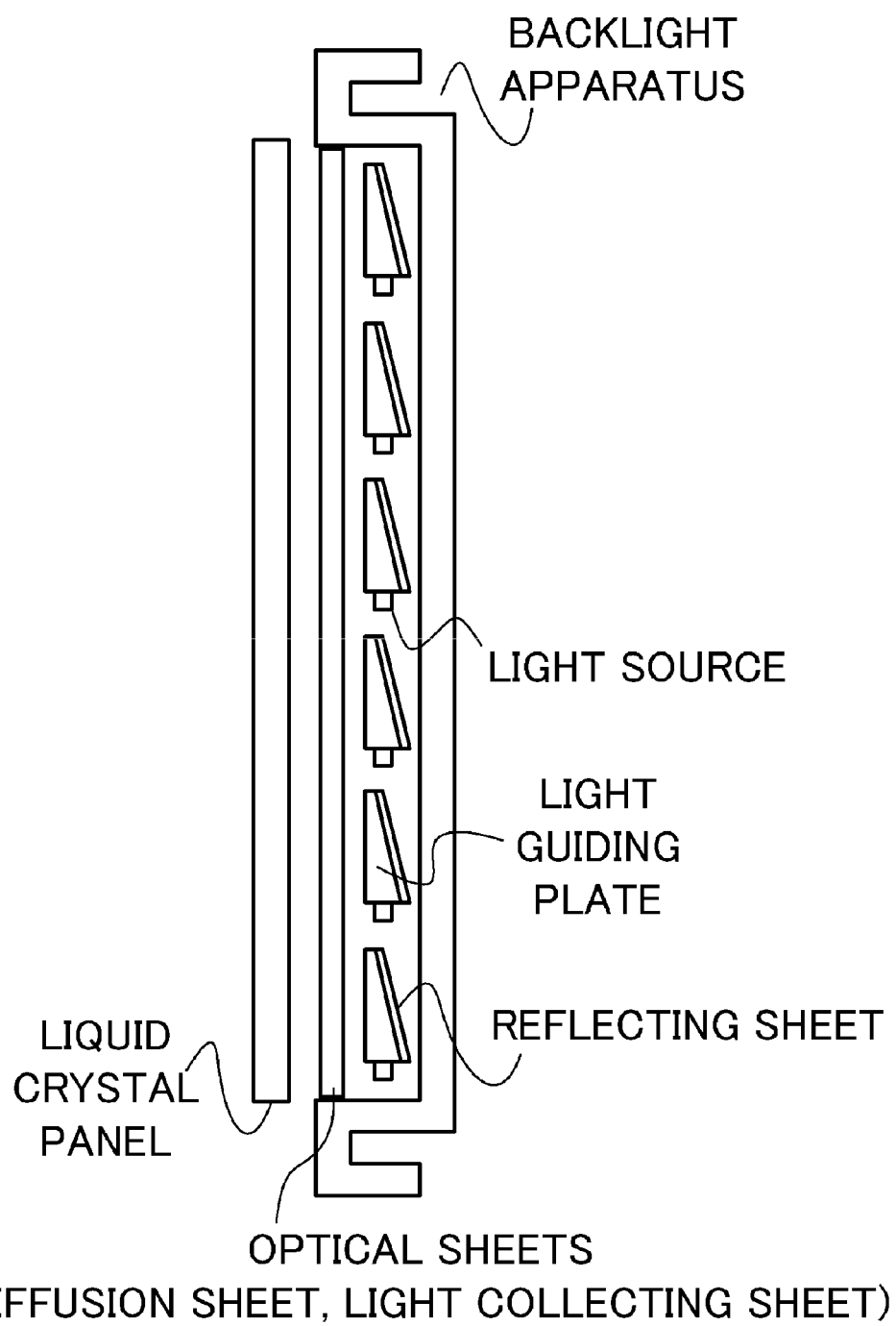

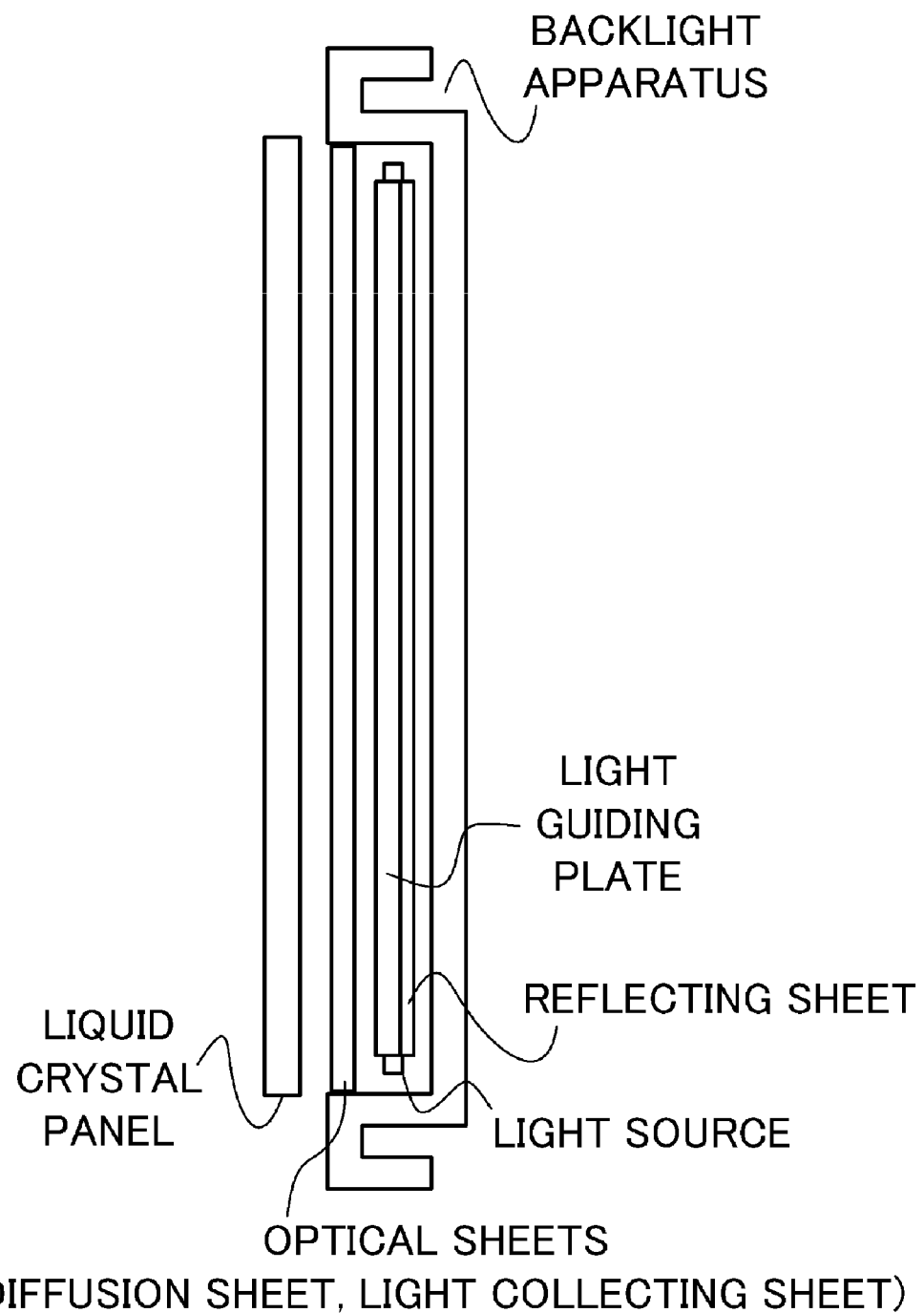

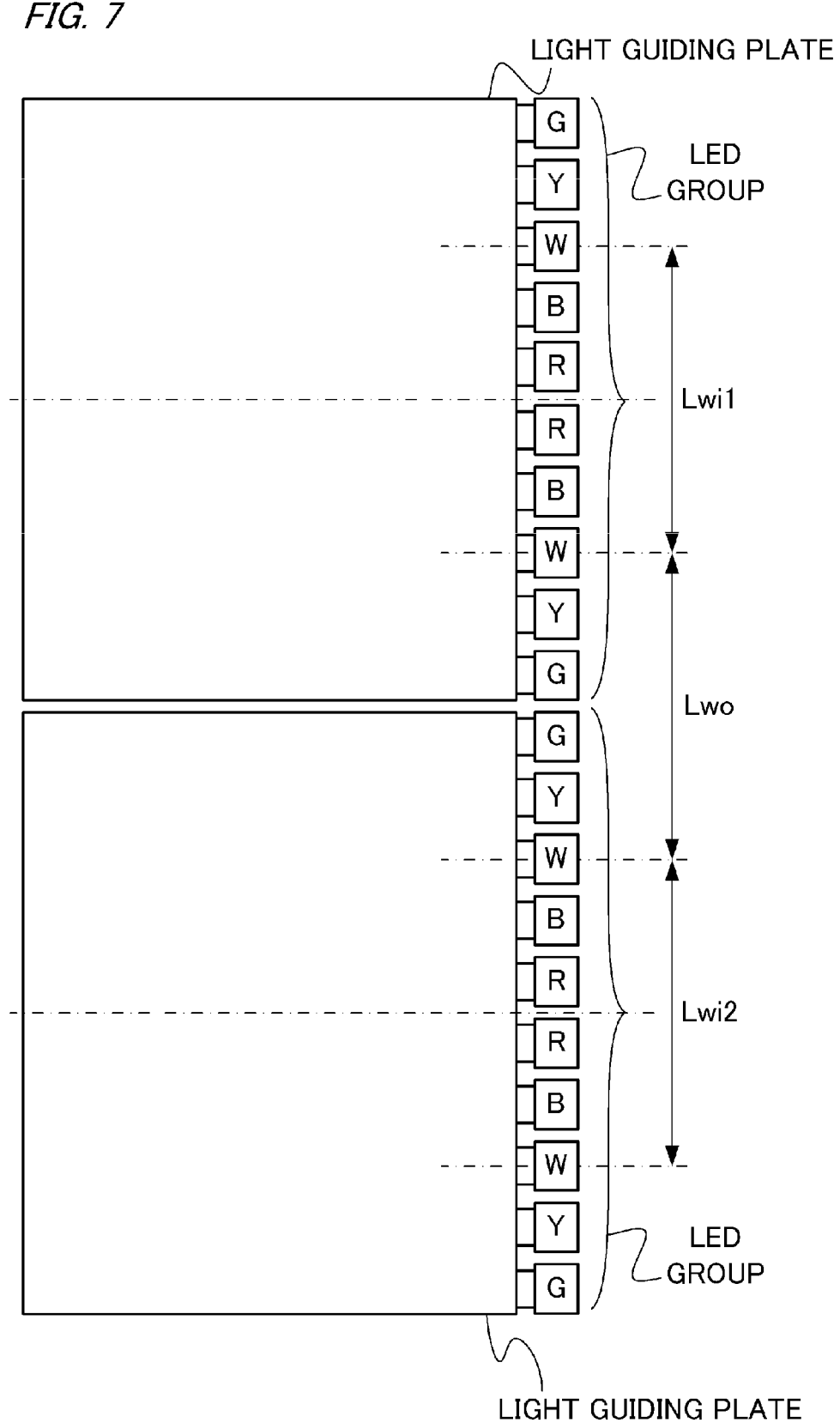

LIGHTING APPARATUS

BACKGROUND OF THE INVENTION

1. Field of the Invention

The present invention relates to a lighting apparatus having a white light source and a plurality of color light sources.

2. Description of the Related Art

There are two methods for displaying the desired color temperature in a liquid crystal display apparatus. With the first method, a backlight apparatus is configured by using a white light source and a color temperature is adjusted by image signal processing. With the second method, a backlight apparatus is configured using a plurality of primary color light sources, such as red, green, and blue light sources, and these primary color light sources are turned on at a light intensity ratio representing the desired color temperature and additive color mixing is performed.

Among these two methods, in the method in which the backlight apparatus is configured using only a white light source, the light emission efficiency is excellent, but the display color gamut is narrowed. Meanwhile, in the method in which the backlight apparatus is configured by using a plurality of primary color light sources, the display color gamut can be expanded, but since the light emission efficiency of each light source is low, energy consumption is difficult to decrease. Accordingly, a method can be considered in which the backlight apparatus is configured using a white light source and a plurality of primary color light sources and both a wide display color gamut and a highlight emission efficiency can be obtained by turning on the white light source and primary color light sources at a light intensity ratio at which the desired color temperature is realized.

Japanese Patent Application Publication No. 2001-351425 discloses a backlight apparatus in which a white fluorescent tube, a red fluorescent tube, a green fluorescent tube, and a blue fluorescent tube are disposed at both sides in the length direction of a light guide plate, and the white fluorescent tube is disposed at a position that is the closest to the light guide plate. With the backlight apparatus disclosed in Japanese Patent Application Publication No. 2001-351425, the decrease in light intensity and variation in color balance caused by deterioration of the fluorescent tubes can be corrected by adjusting the light intensity of each fluorescent tube.

Further, Japanese Patent Application Publication No. 2005-243347 discloses a backlight apparatus in which a plurality of light sources are arranged equidistantly, the emission color differs among the light sources adjacent in the arrangement direction, and outgoing illumination light is obtained by mixing lights emitted from the plurality of light sources. In the backlight apparatus disclosed in Japanese Patent Application Publication No. 2005-243347, at least one light source for which the emission color is that of illumination light is disposes so as to be the closest to the side wall.

SUMMARY OF THE INVENTION

However, a problem associated with the backlight apparatus disclosed in Japanese Patent Application Publication No. 2001-351425 is that since the distance between the light source (fluorescence tube) and the light guide plate differs amount the light sources, the diffusion space in which the light sources are disposed increases. As a result, a light source with a narrow directivity, such as a LED, is not suitable for the light source of the backlight apparatus disclosed in Japanese Patent Application Publication No. 2001-351425.

Further, with the technique disclosed in Japanese Patent Application Publication No. 2005-243347, the white light source is turned on at all times to reduce color unevenness in the vicinity of the side wall. Therefore, a problem associated with the technique disclosed in Japanese Patent Application Publication No. 2005-243347 is that where the light intensity of the white light source located close to the side wall is decreased to improve the display color gamut, the brightness becomes uneven.

Thus, with the conventional methods, brightness unevenness of the backlight apparatus (lighting apparatus) is difficult to inhibit both when the white light source is turned on at an intensity higher than that of the primary color light sources (color light sources) and when the primary color light sources are turned on at an intensity higher than that of the white light source (including the case where only the primary color light sources are turned on).

Accordingly, the present invention provides a lighting apparatus that makes it possible to inhibit brightness unevenness when the light intensity of the color light sources and the light intensity of the white light source are controlled independently from each other.

A lighting apparatus according to the present invention constituted by a plurality of blocks capable of individually controlling brightness or color, comprises:

a light guiding unit in which light falls from an incidence face and goes out from an outgoing face; and a plurality of light sources arranged along the incidence face of the light guiding unit, wherein the plurality of light sources are constituted by a plurality of light source groups such that one light source group corresponds to one block, the one light source group includes a plurality of white light sources and a plurality of color light sources;

among the plurality of color light sources included in the one light source group, color light sources with an emission color of the highest light intensity, when the light sources are driven under identical drive conditions, are disposed at both ends of the light source group; and all of the white light sources included in the plurality of light sources arranged along the incidence face are disposed equidistantly.

In accordance with the present invention, brightness unevenness can be inhibited when the light intensity of the color light sources and the light intensity of the white light source are controlled independently from each other.

Further features of the present invention will become apparent from the following description of exemplary embodiments with reference to the attached drawings.

BRIEF DESCRIPTION OF THE DRAWINGS

FIGS. 1A and 1B illustrate examples of configurations of tandem-type and edge-light-type backlight apparatuses;

FIG. 7 illustrates an example of a configuration of a backlight apparatus according to Embodiment 2;

DESCRIPTION OF THE EMBODIMENTS

Embodiment 1

A backlight apparatus (lighting apparatus) according to Embodiment 1 of the present invention is de scribed be low. The backlight apparatus according to the present embodiment is a backlight apparatus for a liquid crystal display apparatus.

The so-called local dimming control is known as a control method for a backlight apparatus. In the local dimming control, for example, a brightness or color is controlled for each region of the light emission face of the backlight apparatus. The backlight apparatus according to the present embodiment is a local dimming controllable backlight apparatus. More specifically, the backlight apparatus according to the present embodiment is constituted by a plurality of blocks for which a brightness or color can be individually controlled. One block is a minimum unit of local dimming control.

Further the present invention can be applied to a tandem-type backlight apparatus or an edge-light-type (side-light-type) backlight apparatus. FIGS. 1A and 1B show examples of configurations of a tandem-type backlight apparatus and an edge-light-type (side-light-type) backlight apparatus. FIGS. 1A and 1B are cross-sectional views of backlight apparatuses obtained in planes perpendicular to the screen of the liquid crystal display apparatus. A liquid crystal panel is also shown in FIGS. 1A and 1B.

In the tandem-type backlight apparatus, as shown in FIG. 1A, light sources are disposed within a screen (liquid crystal panel) region.

In an edge-light-type backlight apparatus, as shown in FIG. 1B, the light source is disposed at the edge of the screen region.

(Configuration)

Figure 2A:
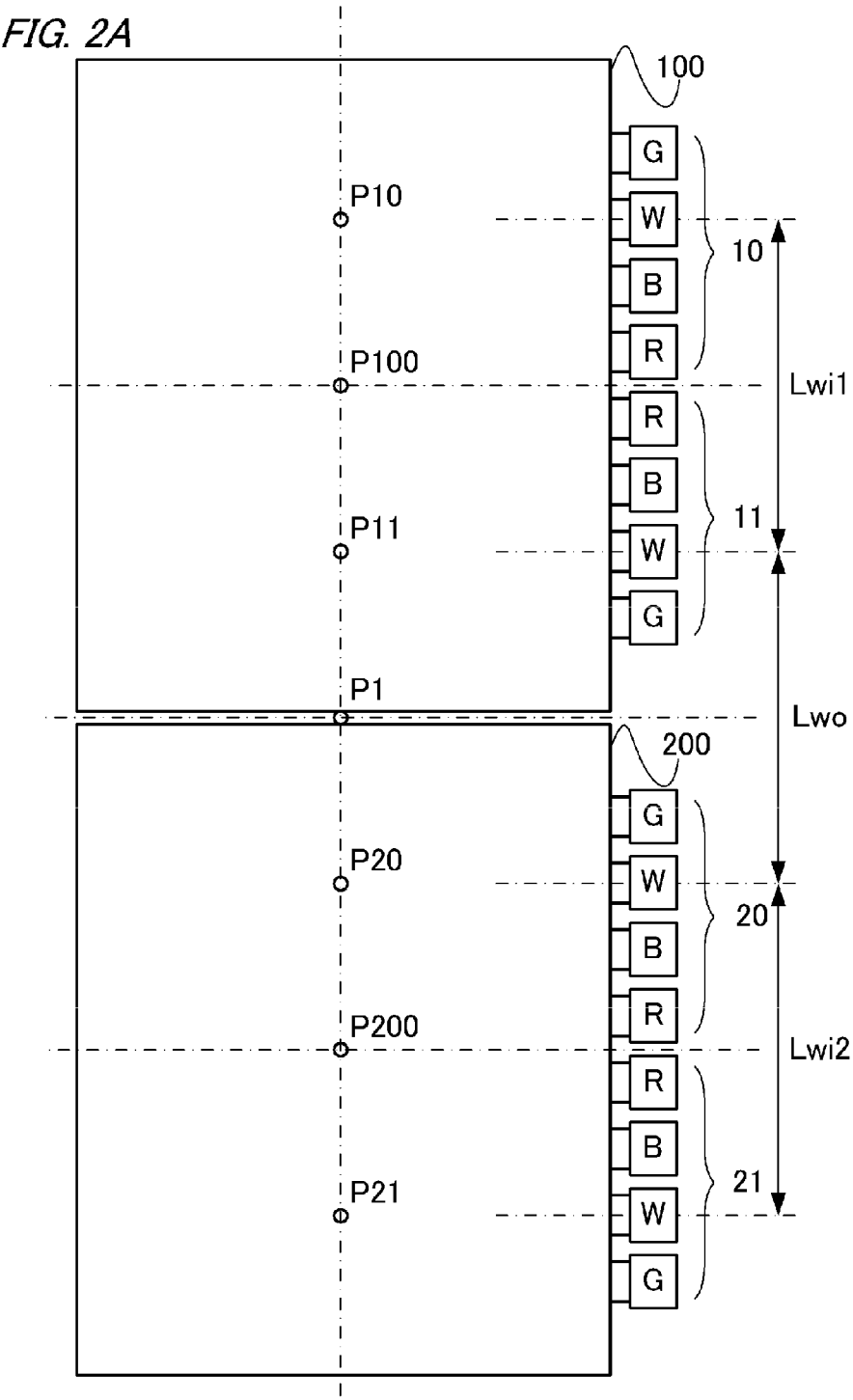
FIGS. 2A and 2B illustrate an example of a configuration of the backlight apparatus according to Embodiment 1.
Figure 2B:
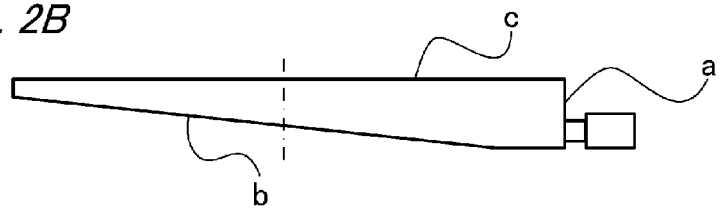

FIGS. 2A and 2B show an example of the configuration of the backlight apparatus according to the present embodiment. FIG. 2A is a plan view, and FIG. 2B is a side view.

The backlight apparatus according to the present embodiment has a light guiding plate (light guiding unit) in which light falls from an incidence face and goes out from an outgoing face, a plurality of light sources (in the present embodiment, LEDs) arranged along the incidence face of the light guiding plate, and LED drive units that drive the light sources (control the light intensity (brightness) of each light source).

In the example shown in FIGS. 2A and 2B, the light guiding plate is constituted by a plurality of light guiding plates (light guiding plates 100, 200) provided for each block. Further, the plurality of light sources are constituted by a plurality of light source groups (a light source group constituted by a LED set 10 and a LED set 11, and a light source group constituted by a LED set 20 and a LED set 21) in which one light source group (LED group) corresponds to one block.

The light guiding plates 100, 200 are constituted, for example, by rectangular transparent resin.

The lights from the LED sets 10, 11 enter the light guiding plate 100 from one end face a (incidence face) of the light guiding plate 100. The incident lights are additively mixed inside the light guiding plate 100 and scattered by a scattering portion, such as a dot pattern, provided at a lower face b (a face on the side opposite that of the liquid crystal panel side) of the light guiding plate 100. The scattered light goes out from an upper face c (face on the liquid crystal panel side; outgoing face) of the light guiding plate 100. A reflecting sheet or the like may be provided instead of the dot pattern. Any configuration may be used, provided that the light can be reflected (scattered).

The light guiding plate 200 is provided adjacently to the light guiding plate 100.

The lights from the LED sets 20, 21 enter the light guiding plate 200 from one end face a of the light guiding plate 200. The incident lights are additively mixed inside the light guiding plate 200 and scattered by a scattering portion provided at a lower face b of the light guiding plate 200. The scattered light goes out from an upper face c of the light guiding plate 200.

In the present embodiment, one light source group includes a plurality of white light sources and a plurality of primary color light sources (color light sources).

More specifically, the LED set 10 is constituted by a white LED (W), a red LED (R), a green LED (G), and a blue LED (B). The red LED is, for example, a light source with a principal wavelength equal to or greater than 611 nm. The green LED is, for example, a light source with a principal wavelength of 490 nm to 549 nm. The blue LED is, for example, a light source with a principal wavelength of 430 nm to 490 nm. Each LED is mounted on a circuit substrate (not shown in the figure). The light intensity of each LED is adjusted according to the brightness or color designated by the user.

Each of the LED sets 11, 20, and 21 is also constituted by a white LED, a red LED, a green LED, and a blue LED, similarly to the LED set 10.

The LED set 10 is a LED set (sub-LED group) in which the red LED, blue LED, white LED, and green LED are disposed in the order of description from the center to the end (end on the side that is not adjacent to the light guiding plate 200) of the end face a of the light guiding plate 100.

The LED set 11 is a LED set in which the red LED, blue LED, white LED, and green LED are disposed in the order of description from the center to the end (end on the side that is adjacent to the light guiding plate 200) of the end face a of the light guiding plate 100.

The LED set 20 and LED set 21 are LED sets in which the red LED, blue LED, white LED, and green LED are disposed in the order of description from the center to the end of the end face a of the light guiding plate 200.

Thus, in the present embodiment, the light sources with the same emission color that are included in one light source group are arranged symmetrically with respect to the center of the block corresponding to the light source group.

(Effect)

Light from a white light source produces a strong effect on brightness unevenness. In particular, where emission efficiency is a priority (when the white light source is turned on at a light intensity higher than that of the primary color light sources (including the case in which only the white light source is turned on)), the light from the white light source produces a strong effect on brightness unevenness. Therefore, where the white light sources are spaced unevenly, brightness unevenness occurs such that the brightness is higher in the portions with a narrow spacing and lower in the portions with a wide spacing.

Accordingly, in the present embodiment, all of the white light sources included in a plurality of light sources (all LED) arranged along the incidence face are disposed equidistantly.

More specifically, the disposition spacing between the white LED of the LED set 10 and the white LED of the LED set 11 is defined as Lwi1. The disposition spacing between the white LED of the LED set 11 and the white LED of the LED set 20 adjacent thereto is defined as Lwo. The disposition spacing between the white LED of the LED set 20 and the white LED of the LED set 21 is defined as Lwi2. In the present embodiment, the white LEDs are disposed so that the spacings Lwi1, Lwo, and Lw2 are all equal to each other.

As a result brightness unevenness (in particular, brightness unevenness in the case where the emission efficiency is a priority) can be inhibited.

Further, the edge of the light guiding plate easily becomes darker than the inner side thereof. Therefore, when the display color gamut is a priority (when the primary color light source is turned on at a light intensity higher than that of the white color light sources (including the case in which only the primary color light source is turned on)), where a light source with a low light intensity is disposed at the end of the light guiding plate, brightness unevenness occurs such that the brightness is lower at the edge than on the inner side. Accordingly, in the present embodiment, among the plurality of primary color light sources included in one light source group, the primary color light sources with an emission color of the highest light intensity, when all of the primary color light sources are driven under the same drive conditions (current or voltage), are disposed at both ends of the light source group. More specifically, when white color is represented using a red light source, a green light source, and a blue light source, the light intensity for the green light source is higher than the light intensity of the red light source and blue light source. In the present embodiment, as shown in FIG. 2A, the green LEDs are disposed at both ends of one light source group. As a result, brightness unevenness can be inhibited when the display color gamut is a priority.

Further, there is a spread among the individual light sources (LED), and even in the light sources with the same emission color (for example, red), the emission colors slightly differ from each other. Moreover, a plurality of light sources with different emission colors are sometimes used to obtain the desired emission color. More specifically, a plurality of red light sources with different principal wavelengths are sometimes used to obtain the desired red light. Further, the light from the red light source (red light) is easier to recognize than the light of other colors due to visual characteristics of human eye.

Therefore, when a plurality of red light sources are included in one light source group, when these red light sources are disposed apart from each other, a difference in emission color can be recognized between the red light sources (that is, color unevenness can occur). Accordingly, in the present embodiment, as shown in FIG. 2A, a plurality of red light sources included in one light source group are disposed adjacently to each other. As a result, red lights emitted from the plurality of red light sources are easily mixed and therefore the difference emission color between the red light sources is difficult to recognize and color unevenness can be inhibited.

Further, in the present embodiment, since the light sources with the same emission color that are included in one light source group are disposed symmetrically with respect to the center of the block corresponding to the light source group, brightness unevenness and color unevenness can be inhibited by comparison with the case of asymmetrical disposition. More specifically, in one block, a light emission in a region on the LED set 10 side from the center and a light emission in a region on the LED set 11 side from the center can be made to same. Therefore, brightness unevenness and color unevenness can be inhibited.

In the configuration using a light guiding plate shared by a plurality of blocks, when only light sources of some blocks are caused to emit light under the local dimming control, light can leak to other blocks that do not emit light. Such light leak causes brightness unevenness or color unevenness. In the present embodiment, a plurality of light guiding plates are used for each block. Therefore, the abovementioned light leak can be inhibited and therefore brightness unevenness and color unevenness can be inhibited.

(Light Intensity of Light Sources)

A method for determining the light intensity of light sources (LEDs) for enabling light emission with inhibited brightness unevenness and color unevenness is described below. The below-described processing is performed, for example, by the manufacturer before the product is shipped. The regions obtained by dividing a block in two in the arrangement direction of a plurality of light sources will be referred to hereinbelow as sub-blocks.

In the present embodiment, the light intensity of light sources is determined such that when a plurality of light sources (all of the LEDs of the backlight apparatus) are turned on, the difference in color between the central position of a first block and the central position of a second block adjacent to the first block is equal to or less than the predetermined threshold. As a result, it is possible to enable emission with inhibited brightness unevenness and color unevenness.

Further, in the present embodiment, the light intensity of light sources is further determined such that when the plurality of light sources are turned on, the difference in color between a central position of a first sub-block and a central position of a second sub-block of another block that is adjacent to the first sub-block is equal to or less than a predetermined threshold. As a result, it is possible to enable emission in which brightness unevenness and color unevenness are inhibited more than in the case in which the determination is based only on the chromaticity between the central positions.

More specifically, the brightness and chromaticity at the central position of each block obtained when a plurality of light sources are turned on are measured. Likewise, the brightness and chromaticity at the central position of each sub-block obtained when a plurality of light sources are turned on are measured. The measurements are performed using a apparatus that can measure brightness and chromaticity, for example, CA-310 manufactured by Konica-Minolta Co.

As a result, a chromaticity coordinate 10*c* (x10, y10) at a point P10, a chromaticity coordinate 11*c* (x11, y11) at a point P11, and a chromaticity coordinate 100*c* (x100, y100) at a point P100 in FIG. 2A are obtained. A chromaticity coordinate 20*c* (x20, y20) at a point P20, a chromaticity coordinate 21*c* (x21, y21) at a point P21, and a chromaticity coordinate 200*c* (x200, y200) at a point P200 are also obtained.

The point P100 is the central position of the outgoing face of the light guiding plate 100. The point P10 is the central position of the region constituting the upper half (LED set 10 side) of the outgoing face of the light guiding plate 100. The point P11 is the central position of the region constituting the lower half (LED set 11 side) of the outgoing face of the light guiding plate 100.

The point P200 is the central position of the outgoing face of the light guiding plate 200. The point P20 is the central position of the region constituting the upper half (LED set 20 side) of the outgoing face of the light guiding plate 200. The point P21 is the central position of the region constituting the lower half (LED set 21 side) of the outgoing face of the light guiding plate 200.

The light intensity of the light sources is adjusted such that the absolute value of the difference between the components of the chromaticity coordinate 100*c* (x100, y100) and the chromaticity coordinate 200*c* (x200, y200) becomes equal to or less than a predetermined value (for example, 0.003). Further, the light intensity of the light sources is adjusted such that the absolute value of the difference between the components of the chromaticity coordinate 11c (x11, y11) and the chromaticity coordinate 20c (x20, y20) becomes equal to or less than a predetermined value (for example, 0.003).

Ideally, it is preferred that the light intensity of light sources be adjusted such that the absolute value of the difference between the components of the chromaticity coordinate 10c (x10, y10) and the chromaticity coordinate 21c (x21, y21) also become equal to or less than a predetermined value (for example, 0.003). However, in the present embodiment, the difference between the components of the chromaticity coordinate 10c (x10, y10) and the chromaticity coordinate 21c (x21, y21) is assumed not to be adjusted. Further, in accordance with the present invention, it is not necessary that the absolute value of the difference between the components of the chromaticity coordinate 11c (x11, y11) and the chromaticity coordinate 20c (x20, y20) be made equal to or less than a predetermined value (for example, 0.003). As a minimal restriction, the light intensity of light sources may be adjusted such that the absolute value of the difference between the components of the chromaticity coordinate 100c (x100, y100) and the chromaticity coordinate 200c (x200, y200) becomes equal to or less than a predetermined value (for example, 0.003). In this case, 0.003 (scale in the x, y chromaticity diagram of the CIE color representation system) is presented by way of example as an allowed value of the difference between chromaticity coordinates, but such a selection is not limiting. The allowed value of the difference between chromaticity coordinates differs depending on the characteristics of display and sometimes may be about, for example, 0.05.

Figure 3:
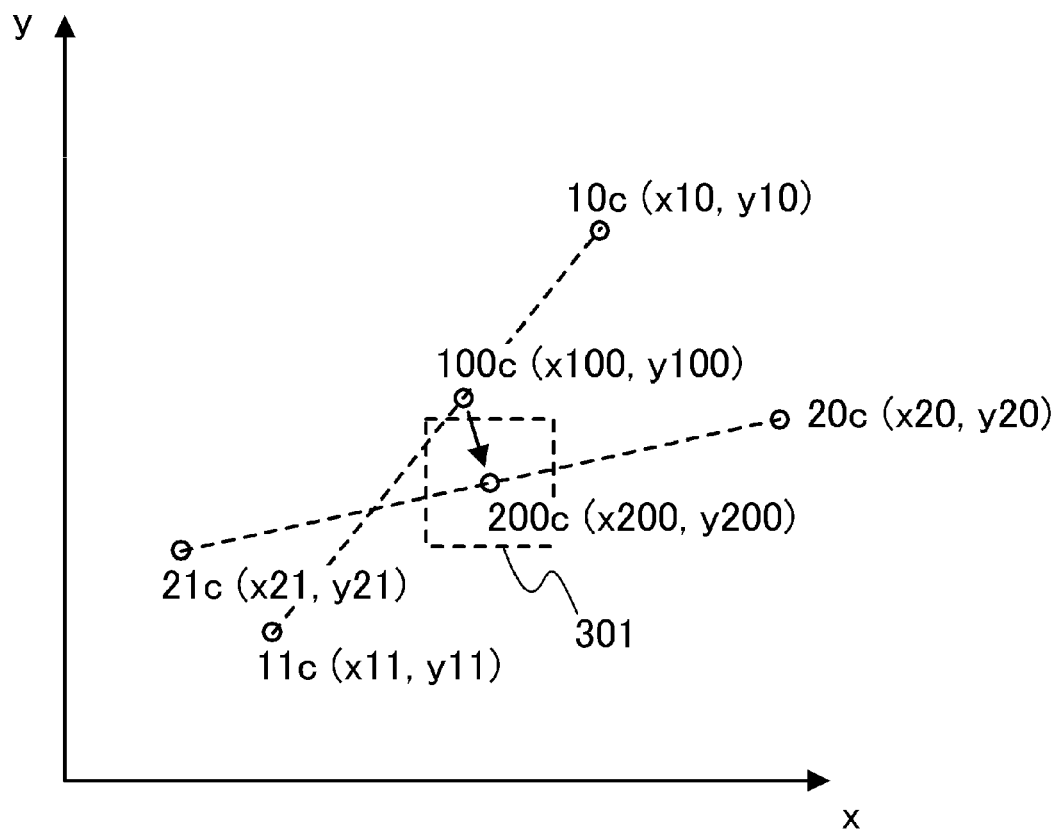
FIG. 3 illustrates an example of a graph of chromaticity coordinates according to Embodiment 1.

FIG. 3 shows an example of a graph in which the aforementioned six chromaticity coordinates are plotted. The graph shown in FIG. 3 is a graph (x, y chromaticity diagram of the CIE color representation system) in which the horizontal axis is the x value of the chromaticity coordinate (x, y), and the vertical axis is the y value. The case in which the light intensity of the light sources is adjusted such that the absolute value of the difference between the components of the chromaticity coordinate 100c (x100, y100) and the chromaticity coordinate 200c (x200, y200) becomes equal to or less than a predetermined value (for example, 0.003) is explained below.

In the case where the chromaticity coordinate 200c (x200, y200) is fixed and the chromaticity coordinate 100c (x100, y100) is changed, the light intensity of light sources (primary color light sources) is adjusted such that the point with the chromaticity coordinate 100c (x100, y100) is positioned inside the region shown by a broken line 301 in FIG. 3. Where the adjustment is performed such as to move the chromaticity coordinate 100c (x100, y100), the positions of the chromaticity coordinate 10c (x10, y10) and the chromaticity coordinate 11c (x11, y11) also move.

For example, when the chromaticity coordinate 100c (x100, y100) is closer to red color than the chromaticity coordinate 200c (x200, y200), the light intensity of the red light sources of the LED set 10 or LED set 11 decreases. Then, the brightness and chromaticity are measured again. The changes in light intensity, the adjustment of brightness and chromaticity, and the measurements of brightness and chromaticity are repeated till the abovementioned condition is fulfilled (till the point with the chromaticity coordinate 100c (x100, y100) is positioned inside the region shown by the broken line 301). As a result, the light intensity of light sources (LEDs) is determined such that enables light emission with small brightness unevenness or color unevenness.

Ideally, it is preferred that the difference between the components of the chromaticity coordinate 100c (x100, y100) and the chromaticity coordinate 200c (x200, y200), the difference between the components of the chromaticity coordinate 11c (x11, y11) and the chromaticity coordinate 20c (x20, y20), and the difference between the components of the chromaticity coordinate 10c (x10, y10) and the chromaticity coordinate 21c (x21, y21) be zero. However, it is actually difficult to reduced all of these differences to zero. Therefore, the light intensity of the light sources is adjusted such that the difference between the components of the chromaticity coordinate 100c (x100, y100) and the chromaticity coordinate 200c (x200, y200) becomes substantially zero.

In the present embodiment, the brightness and chromaticity at each point are measured in a state in which all of the LEDs of the backlight apparatus are turned on, but the brightness and chromaticity at each point may be measured in a state in which only the corresponding LEDs are turned on. For example, the brightness and chromaticity at the point P10 may be measured in a state in which only the LED set 10 is turned on. The brightness and chromaticity at the point P100 may be measured in a state in which only the LED sets 10 and 11 are turned on.

As described hereinabove, in the present embodiment, among a plurality of primary color light sources included in one light source group, the primary color light sources with an emission color of the highest light intensity, when the light sources are driven under identical drive conditions (in terms of electric current or voltage), are disposed at both ends of the light source group, and the white light sources are disposed equidistantly. As a result, brightness unevenness can be inhibited when the light intensity of the primary color light sources and the light intensity of the white light sources are controlled independently from each other. More specifically, brightness unevenness can be inhibited when the white light sources are turned on at a light intensity higher than that of the primary color light sources and when the primary color light sources are turned on at a light intensity higher than that of the white light sources.

The above-described backlight apparatus can be used as is as an edge-light-type backlight apparatus. Further, a tandem-type backlight apparatus can be configured by arranging a plurality of the above-described backlight apparatuses in the direction perpendicular to the arrangement direction of light sources.

Further, in the present embodiment, the case is explained where one light guiding plate has one incidence face, but one light guiding plate may have a plurality of incidence faces. For example, a plurality of light sources may be also arranged on a face on the side opposite that of the face a in FIG. 2B.

In the present embodiment, the case is explained where the light sources are LEDs, but the light sources are not limited to LEDs. For example, the light sources may be fluorescent tubes.

Color unevenness and brightness unevenness can be further inhibited by adjusting the distance between the light guiding plate and the diffusion plate (diffusion sheet in FIGS. 1A and 1B) provided between the light guiding plate and the liquid crystal panel.

Figure 4:
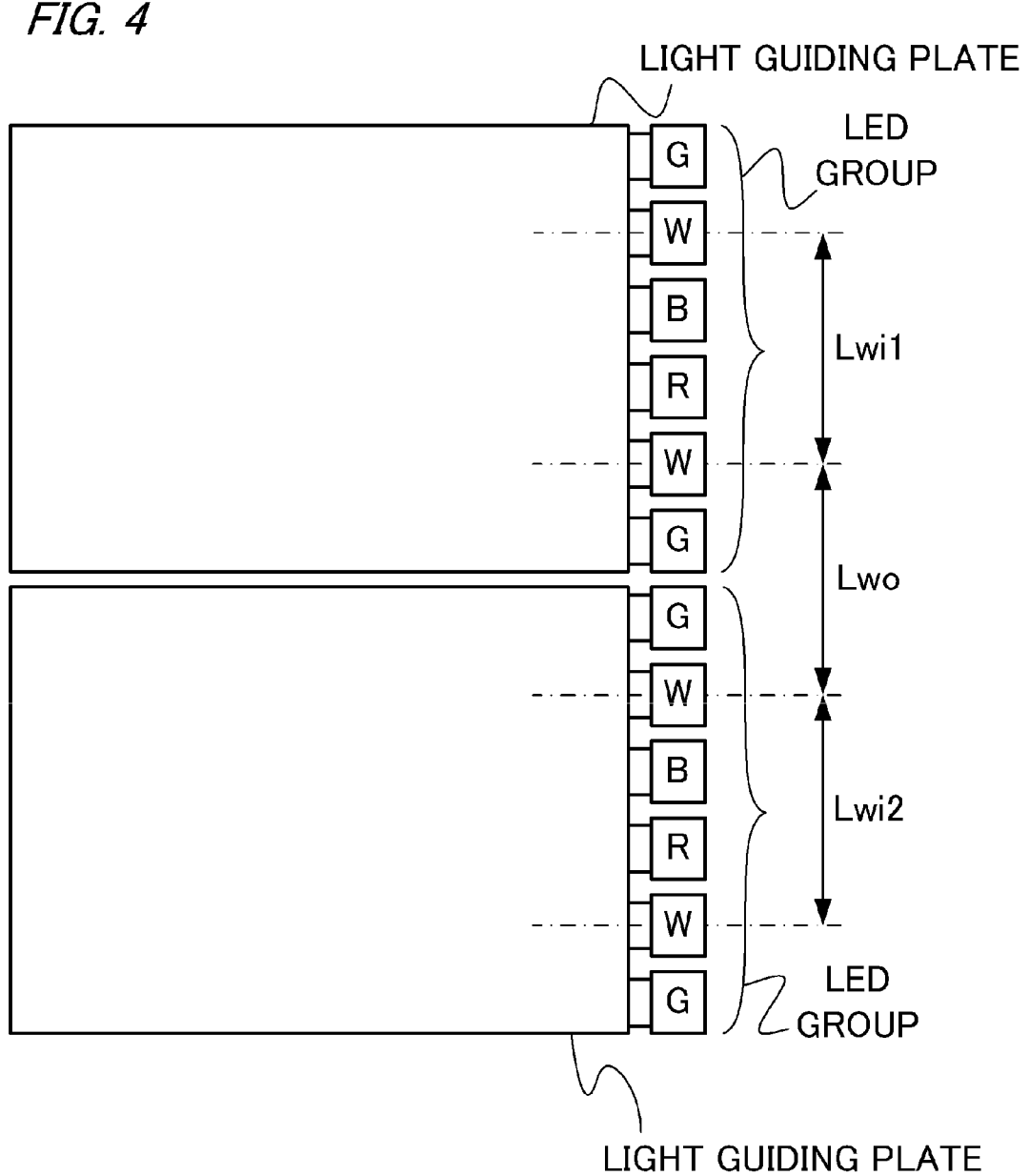
FIG. 4 illustrates an example of a configuration of a backlight apparatus according to Embodiment 1.

Further, in the present embodiment, the case is explained where the light sources with the same emission color that are included in one light source group are disposed symmetrically with respect to the center of the block corresponding to the light source group, but such a configuration is not limiting. Among a plurality of primary color light sources included in one light source group, the primary color light sources with an emission color of the highest light intensity, when the light sources are driven under identical drive conditions (current or voltage), are disposed at both ends of the light source group, and the white light sources are disposed equidistantly. For example, a configuration may be used in which, as shown in FIG. 4, one light source group is constituted by two green light sources, two white light sources, one red light source, and one blue light source.

Figure 5:
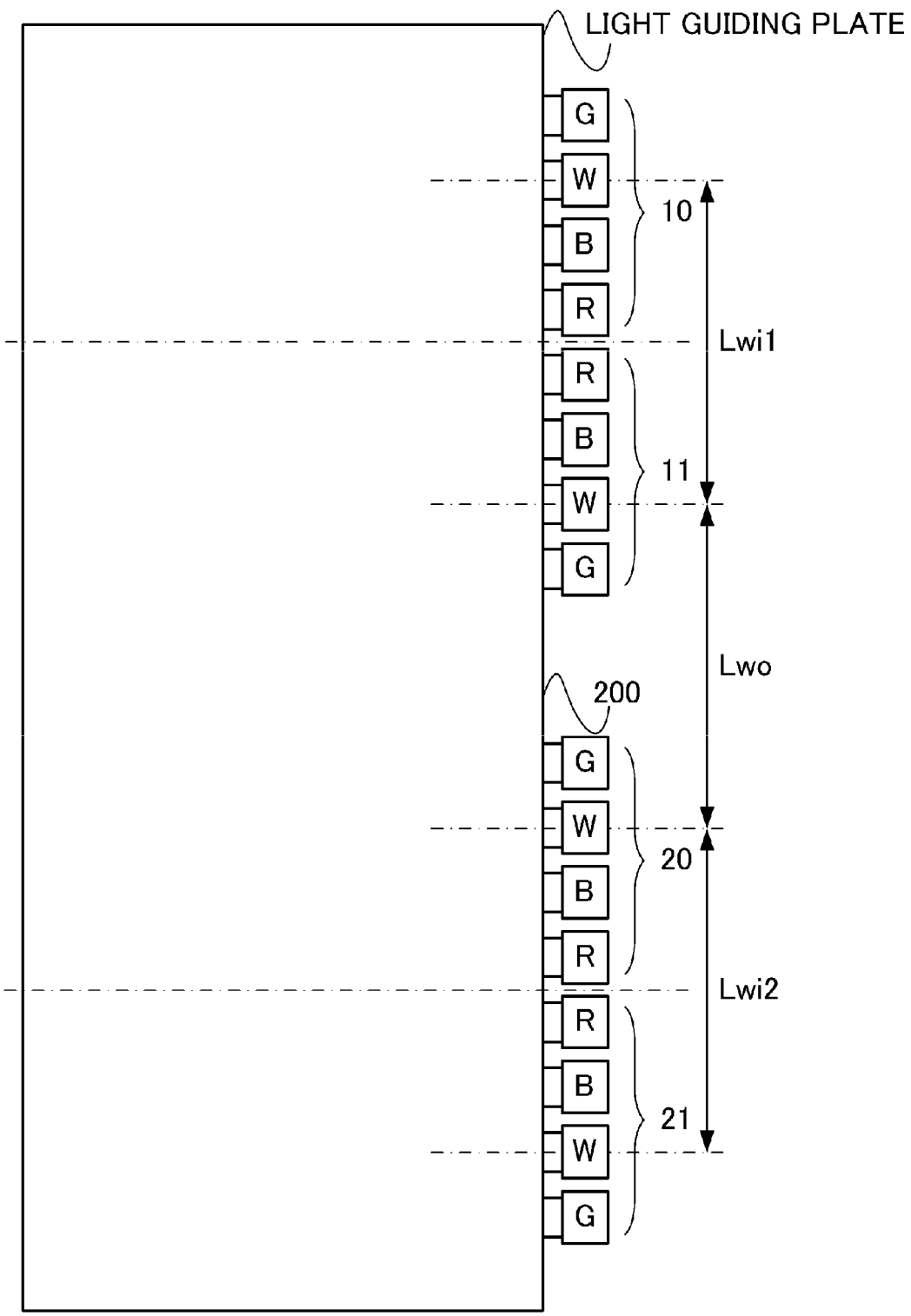
FIG. 5 illustrates an example of a configuration of a backlight apparatus according to Embodiment 1.

In the present embodiment, the case is explained in which a plurality of light guiding plates are used for each block, but such a configuration is not limiting. As shown in FIG. 5, a configuration including only one light guiding plate may be also used. A configuration having one light guiding plate for a plurality of blocks may be also used (for example, when the number of blocks is eight, one light guiding plate may be used for every two blocks).

Embodiment 2

(Configuration)

Figure 6:
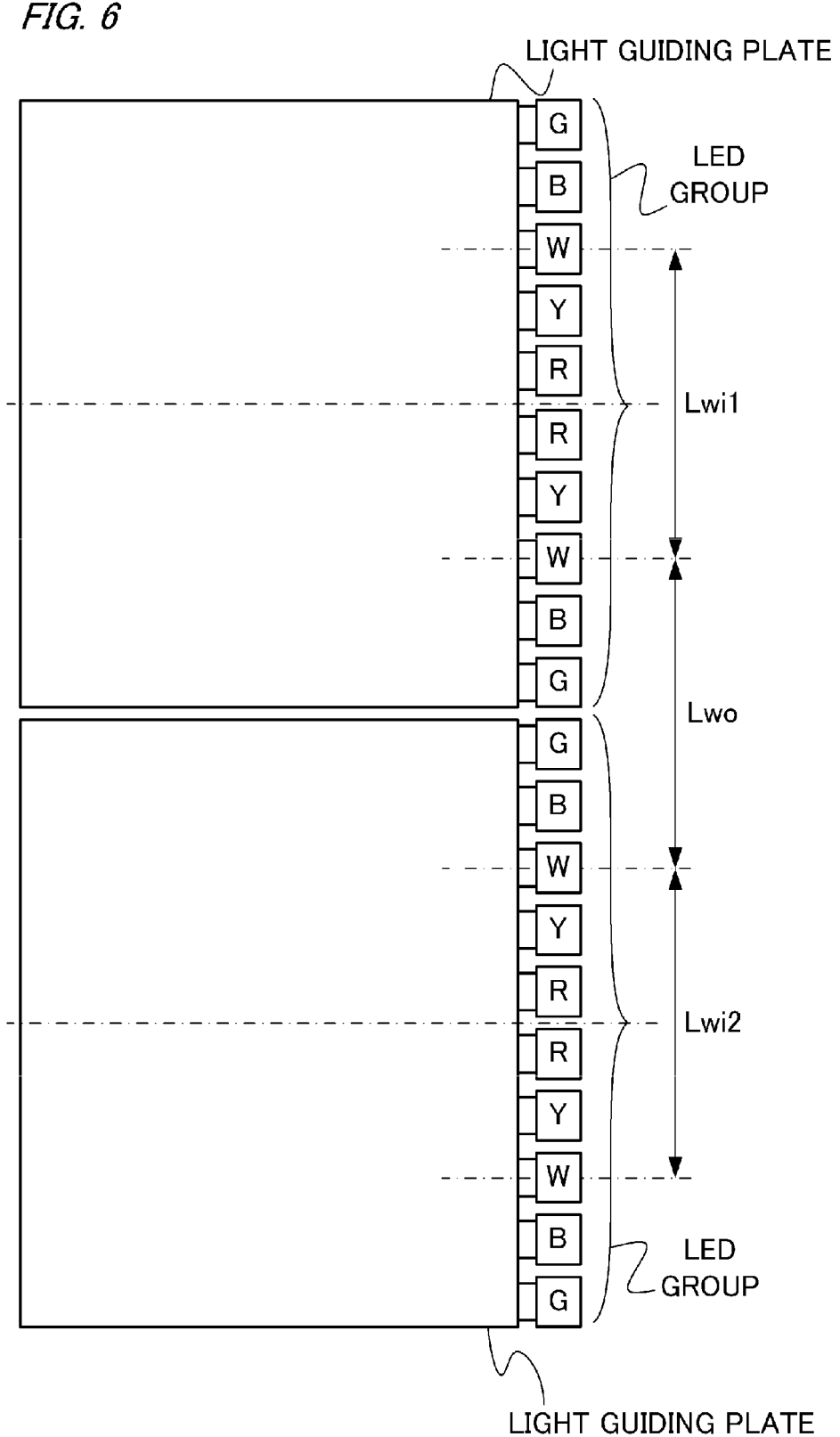
FIG. 6 illustrates an example of a configuration of a backlight apparatus according to Embodiment 2.

The backlight apparatus according to Embodiment 2 of the present invention is explained below. FIGS. 6 and 7 show an example of the configuration of the backlight apparatus according to the present embodiment.

In the backlight apparatus according to the present embodiment, one light source group includes a red light source, a green light source, and a yellow light source (Y). The yellow light source is a light source of a yellow system, such as a yellow light source, an orange light source, and a yellow-green light source.

The yellow light source included in one light source group is disposed adjacently to at least a light source, from among the red light source and green light source included in the light source group, for which the difference in a principal wavelength with the yellow light source is smaller. More specifically, when the principal wavelength of the yellow light source (yellow LED) is 580 nm to 610 nm, the yellow LED is disposed adjacently to the red LED (between the red LED and the white LED), as shown in FIG. 6. Further, when the principal wavelength of the yellow LED is 550 nm to 579 nm, the yellow LED is disposed adjacently to the green LED (between the green LED and the white LED), as shown in FIG. 7.

(Effect)

With the configuration using the yellow light source, the case where the object is to mix the light from the yellow light source and the light from the red light source to realize the light of the desired color and the case where the object is to mix the light from the yellow light source and the light from the green light source to realize the light of the desired color can be considered.

When the principal wavelength of the yellow light source is close to the principal wavelength of the red light source, the object is to mix the light from the yellow light source and the light from the red light source to realize the light of the desired color. Therefore, by disposing the yellow light source adjacently to the red light source, the lights from these light sources can be easily mixed (the light of the desired color can be easily obtained). As a result, color unevenness can be inhibited.

When the principal wavelength of the yellow light source is close to the principal wavelength of the green light source, the object is to mix the light from the yellow light source and the light from the green light source to realize the light of the desired color. Therefore, by disposing the yellow light source adjacently to the green light source, the lights from these light sources can be easily mixed (the light of the desired color can be easily obtained). As a result, color unevenness can be inhibited.

As described hereinabove, in the present embodiment, the yellow light source included in one light source group is disposed adjacently to at least a light source, from among the red light source and green light source included in the light source group, for which the difference in a principal wavelength with the yellow light source is smaller. As a result, color unevenness can be inhibited.

Embodiment 3

The backlight apparatus according to Embodiment 3 of the present invention is described below. The configuration of the backlight apparatus according to the present embodiment is similar to that of Embodiment 1 and the explanation thereof is herein omitted. In the present embodiment, a method for determining the light intensity of light sources (LEDs) such that enables emission with inhibited brightness unevenness or color unevenness is different from that of Embodiment 1. This method will be explained below in detail.

(Light Intensity of Light Source)

In the present embodiment, the light intensity of the light sources is determined such that when the plurality of light sources (all the LEDs of the backlight apparatus) are turned on, the difference in color between the central position of a first block, the central position of a second block adjacent to the first block and a middle point between those central positions is equal to or less than a predetermined threshold.

More specifically, the brightness and chromaticity at the point P11, point P100, point P20, and point P200 is measured in the same manner as in Embodiment 1.

The chromaticity coordinate in the middle point (point P1 in FIG. 2A) between the point P100 and the point P200 is calculated by the following Eq. 1 by using the brightness value Y11 and chromaticity coordinate 11*c* (x11, y11) of the point P11 and the brightness value Y20 and chromaticity coordinate 20*c* (x20, y20) of the point P20.

$$x1=(Y11 \times x11 \times y20+Y20 \times x20 \times y11)/(Y11 \times y20+Y20 \times y11)$$

$$y1=y11 \times y20 \times (Y11+Y20)/(Y11 \times y20+Y20 \times y11) \quad \text{(Eq. 1)}$$

The light intensity of light sources is then adjusted such that the absolute value of the difference between the calculated chromaticity coordinate 1*c* (x1, y1) and the chromaticity coordinate 100*c* (x100, y100) and the absolute value of the difference between the calculated chromaticity coordinate 1*c* (x1, y1) and the chromaticity coordinate 200*c* (x200, y200) is equal to or less than a predetermined value (for example 0.003). For example, when the chromaticity coordinate at the point P1 is closer to red color than the chromaticity coordinate at the points P100 and P200, the light intensity of the red light sources in the LED set 11 and the LED set 20 is decreased.

As described hereinabove, in the present embodiment, the light intensity of the light sources is determined such that when the plurality of light sources are turned on, the difference in color between the central position of a first block, the central position of a second block adjacent to the first block and a middle point between those central positions is equal to or less than a predetermined threshold. As a result, brightness unevenness and color unevenness can be inhibited.

Further, in the present embodiment, the restricting conditions are relaxed in comparison with those of Embodiment 1, because the chromaticity coordinate at the middle point P1 is compared with the chromaticity coordinate at the point P100 and chromaticity coordinate at the point P200 (the difference between the chromaticity coordinate at the point P100 and the chromaticity coordinate at the point P200 is taken into account). Therefore, this embodiment is preferably used when the block size is large and a spread in performance among the light sources is large.

A method for calculating the chromaticity coordinate at the middle point P1 is not particularly limited. The calculations may be performed by using the brightness value and chromaticity coordinate of a point other than the point P11 and point P20. When a light guiding plate is shared by mutually adjacent blocks, the chromaticity coordinate of the middle point may be acquired by measurements.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-131267, filed on Jun. 13, 2011, which is hereby incorporated by reference herein in its entirety.

What is claimed is:

1. A lighting apparatus constituted by a plurality of blocks capable of individually controlling brightness or color, comprising:
   a light guiding unit in which light incidents from an incidence face and goes out from an outgoing face; and
   a plurality of light sources arranged along the incidence face of the light guiding unit, wherein
   the plurality of light sources are constituted by a plurality of light source groups such that one light source group corresponds to one block,
   the one light source group includes a plurality of white light sources and a plurality of color light sources;
   among the plurality of color light sources included in the one light source group, color light sources with an emission color of the highest light intensity, when the light sources are driven under identical drive conditions, are disposed at both ends of the light source group; and
   all of the white light sources included in the plurality of light sources arranged along the incidence face are disposed equidistantly.

2. The lighting apparatus according to claim 1, wherein the color light source with an emission color of the highest light intensity is a green light source.

3. The lighting apparatus according to claim 1, wherein the one light source group includes a plurality of red light sources; and
   the plurality of red light sources included in the one light source group is disposed adjacently to each other.

4. The lighting apparatus according to claim 1, wherein light sources with the same emission color that are included in the one light source group are disposed symmetrically with respect to a center of a block corresponding to the light source group.

5. The lighting apparatus according to claim 1, wherein
   the one light source group includes a red light source, a green light source, and a yellow light source; and
   the yellow light source included in the one light source group is disposed adjacently to at least a light source having a smaller difference in a principal wavelength from among the red light source and the green light source included in the light source group.

6. The lighting apparatus according to claim 1, wherein the light guiding unit is constituted by a plurality of light guiding units provided for each block.

7. The lighting apparatus according to claim 1, wherein
   a light intensity of the light sources is determined such that when the plurality of light sources are turned on, the difference in color between a central position of a first block and a central position of a second block adjacent to the first block is equal to or less than a predetermined threshold.

8. The lighting apparatus according to claim 7, wherein
   when regions obtained by dividing a block in two in an arrangement direction of the plurality of light sources are defined as sub-blocks,
   the light intensity of the light sources is further determined such that when the plurality of light sources are turned on, the difference in color between a central position of a first sub-block and a central position of a second sub-block of another block that is adjacent to the first sub-block is equal to or less than a predetermined threshold.

9. The lighting apparatus according to claim 1, wherein
   the light intensity of the light sources are determined such that when the plurality of light sources is turned on, the difference in color between a central position of a first block, a central position of a second block adjacent to the first block and a middle point between those central positions is equal to or less than a predetermined threshold.

* * * * *